United States Patent
Park et al.

(10) Patent No.: US 6,680,087 B2
(45) Date of Patent: Jan. 20, 2004

(54) SUPERIOR STAIN RESISTANT DECORATIVE FLOOR COVERING AND ITS METHOD OF MANUFACTURE

(75) Inventors: Ho-Zun Park, Choongcheongbuk-do (KR); Min-Ho Son, Choongcheongbuk-do (KR)

(73) Assignee: LG Chem, Ltd., Seoul (KR)

( * ) Notice: Subject to any disclaimer, the term of this patent is extended or adjusted under 35 U.S.C. 154(b) by 80 days.

(21) Appl. No.: 10/106,595

(22) Filed: Mar. 26, 2002

(65) Prior Publication Data

US 2003/0191208 A1 Oct. 9, 2003

Related U.S. Application Data

(62) Division of application No. 09/370,632, filed on Aug. 6, 1999, now Pat. No. 6,384,101.

(30) Foreign Application Priority Data

Mar. 12, 1999 (KR) .............................. 10-1999-0008262

(51) Int. Cl.$^7$ .................................................. C08F 2/48
(52) U.S. Cl. ...................... 427/508; 427/515; 427/517; 427/519; 522/83; 522/90; 522/96
(58) Field of Search ................................ 427/508, 515, 427/517, 519; 522/83, 90, 96

(56) References Cited

U.S. PATENT DOCUMENTS

| 4,214,028 A | * | 7/1980 | Shortway et al. ........... 428/159 |
| 4,227,980 A | | 10/1980 | Pregitzer et al. |
| 5,183,831 A | | 2/1993 | Bielat et al. |
| 5,977,200 A | | 11/1999 | Lake |
| 6,103,352 A | * | 8/2000 | Takahashi ................ 428/195.1 |

FOREIGN PATENT DOCUMENTS

JP          61209927 A          3/1985

* cited by examiner

*Primary Examiner*—Michael Barr
*Assistant Examiner*—Elena Tsoy
(74) *Attorney, Agent, or Firm*—Alston & Bird LLP

(57) ABSTRACT

A surface treatment composition of the present invention comprises (A) urethaneacrylate oligomer, (B) acrylate based monomer, (C) photoinitiator, (D) silicon additive, and (E) silica matting agent. The present invention provides a surface treatment composit on in which imparts beneficial properties to urethaneacrylate decorative floor coverings, including urethaneacrylates formed from soft type urethaneacrylate oligomer, hard type urethaneacrylate oligomer a and a mixture of soft type and hard type urethaneacrylate oligomer The stain resistance of a decorative floor covering in which a surface treating sub-layer is formed by UV curing after an above surface treatment composition is coated is excellent.

2 Claims, 2 Drawing Sheets

SUPERIOR STAIN RESISTANT DECORATIVE FLOOR COVERING AND ITS METHOD OF MANUFACTURE

CROSS REFERENCE TO RELATED APPLICATION

This application is a divisional of U.S. patent application No. 09/370,632 filed Aug. 6, 1999 now U.S. Pat. No. 6,384,101 which, in turn, claims priority based on application No. 10-1999-0008262 filed in the Korean Industrial Property Office on Mar. 12, 1999, the contents of both of which are incorporated herein by reference.

BACKGROUND OF THE INVENTION (a) Field of the Invention

The present invention relates to a surface treatment composition, a decorative floor covering, and a method for manufacturing the same, and more particularly, to a polyurethane based surface treatment composition having excellent stain resistance a decorative floor covering of which the surface is treated by this composition, and a method for manufacturing the same.

(b) Description of the Related Art

Generally, a residential decorative floor covering, which is mainly used for finishing floors of a living room and a bed room for an individual residence or apartment, not only provides a hygienic space that covers the dust and coldness of a cement floor, but also has a decorative effect by transforming the space into a cozy indoor living environment in accordance with aesthetic patterns of various colors printed on its surface.

When such surfaces of these conventional decorative floor coverings are stained with polluting materials, customers sometimes can not remove all traces of the polluting materials easily. Materials staining decorative floor coverings are mainly divided into writing materials, foodstuffs and beverages, and household goods. These writing materials include oil based magic marker pens, ballpoint pens, other writing inks. Chinese inks used for brush writing, color pencils, pastel crayons, fluorescent hi-liting pens, etc. Staining foodstuffs and beverages include soysauce, soybean paste, hot pepper paste, noodles with bean sauce, curry, starch syrup, grape juice, watermelon, yogurt, ketchup, chocolate, persimmons, coffee, mustard, coca cola, kimchi juice, etc. Other household goods that can stain include shoe polish, disinfectant, dermatophytosis healing agents, nail polish, oil paint, water paint, varnish, pigment solutions, natural dye transfer agents, paper dye transfer agents, children's urine, etc.

Surface treatment methods for decorative floor coverings include a method of hardening polyurethane based paints using ultra violet (UV) rays, a method of water-treating polyurethane based paints to dry the paints, and a method of laminating the decorative floor covering using stain resistant films such as a fluorine film. Of these surface treatment methods the first method of curing polyurethane based paints using UV rays has a fast curing rate, excellent coating performance as well as curing characteristics, a small amount of energy consumption, is pollution free, and is particularly preferable for the improvement of stain resistance characteristics.

Conventionally, a composition using soft type urethaneacrylate oligomer and containing a large amount of single functional group monomer 2-hydroxypropylacrylate as a polyurethane based surface treatment composition has mainly been used to provide abrasion resistance and scratch resistance for decorative floor coverings. Although soft type urethaneacrylate oligomer can soften a decorative floor covering and provides abrasion resistance and scratch resistance, it has poor stain resistance due to the oligomer's low density of elaborate cross-links. Further, the single functional group monomer 2-hydroxypropylacrylate, a substantial amount of which is used to lower the viscosity of urethaneacrylate oligomer, has a slower reaction speed than that of a multi-functional group monomer since a single functional group monomer (as opposed to a multi-functional group monomer) is greatly affected by oxygen disturbing the curing of the surface. Therefore, because of such problems, surfaces with surface treatment layers using large amounts of single functional group monomers can not be precisely manufactured to furnish stain resistance properties on decorative floors.

SUMMARY OF THE INVENTION

It is an object of the present invention to provide a polyurethane based surface treatment composition for a superior slain resistant decorative floor covering.

It is also an other object of the present invention to provide a decorative floor covering the surface of which is treated with a superior stain resistant surface treatment composition and a manufacturing method of the same.

The present invention provides a polyurethane based composition comprised of urethaneacrylate oligomer, acrylate based monomer, photoinitiator, and additives as well as a decorative floor covering composed of this composition, and a manufacturing method of the same.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE PREFERRED EMBODIMENTS

Figure 1A:
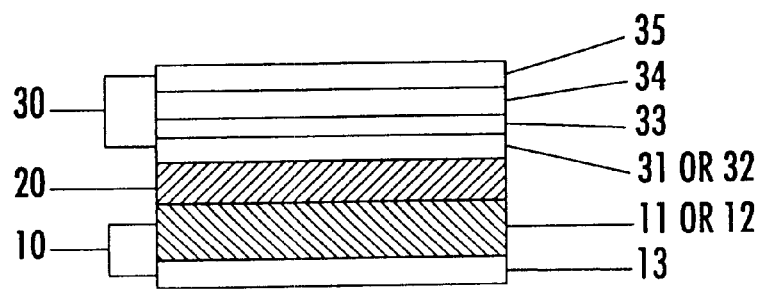
FIGS. 1a to 1d are cross-sectional views of a decorative floor covering in accordance with the present invention.

In the following detailed description, only the preferred embodiment of the invention has been shown and described, simply by way of illustration of the best mode contemplated by the inventors of carrying out the invention. As will be realized, the invention is capable of modification in various obvious respects, all without departing from the invention. Accordingly, the drawings and description are to be regarded as illustrative in nature, and not restrictive.

The present invention relates to a stain resistant polyurethane based surface treatment composition comprising (A) urethaneacrylate oligomer (B) acrylate based monomer (C) photoinitiator, (D) silicon additive, and (E) silica matting agent; a decorative floor covering in which a stain resistant surface treating sub-layer is formed by coating the above surface treatment composition and ultra violet light (UV) curing; and a method for manufacturing the same. This invention is described in detail below.

In the preferred embodiments of the present invention, a surface treatment composition provides abrasion resistance and scratch resistance on the surface of a decorative floor covering using soft type urethaneacrylate oligomer, and ameliorates the lowered stain resistant problems due to a low density of elaborate cross-links by employing small amounts of single functional group monomer. The above surface treatment composition is comprised of (A) 40 weight parts of soft type urethaneacrylate oligomer, (B) acrylate based monomer comprising 7 to 11 weight parts of single functional group monomer, 34 to 43 weight parts of bi-functional group monomer, and 0 to 5 weight parts of acrylate based tri-functional group monomer, (C) 4 Weight parts of acetophenone photoinitiator, (D) 1 weight part of silicon additive, and (E) 5 weight parts of silica matting agent.

In other preferred embodiments of the present invention, stain resistance is improved with a surface treatment composition employing only hard type urethaneacrylate while using no single functional group monomer so that cross linking density is raised and the oxygen effects prohibiting the surface curing are minimized. The above composition is manufactured by mixing (A) 45 to 50 weight parts of hard type urethaneacrylate oligomer, (B) acrylate based monomer comprised of 10 to 25 weight parts of bi-functional group monomer, and 20 to 30 weight parts of tri-functional group monomer, (C) 1 to 5 weight parts of acetophenone photoinitiator, (D) 0.5 to 3 weight parts of silicon additive, and (E) 3 to 10 weight parts of silica matting agent.

In other preferred embodiments of the present invention, a mixture of soft type and hard type urethaneacrylate oligomer is used, and a mixture of acetophenone and benzophenone as a photoinitiator is used. As benzophenone can not be activated by ultraviolet rays, it is essential to add tertiary amine compound as a reaction promoter. Therefore, the above surface treatment composition comprises (A) 10 to 20 weight parts of soft type urethaneacrylate oligomer and 25 to 35 weight parts of hard type urethaneacrylate oligomer, (B) acrylate based monomer comprised of 5 to 10 weight parts of single functional group monomer, 15 to 25 weight parts of bi-functional group monomer, and 10 to 25 weight parts of tri-functional group monomer, (C) photoinitiator comprised of 1 to 5 weight parts of acetophenone. and 0.1 to 2 weight parts of benzophenone. (D) 0.5 to 3 weight parts of silicon additive, (E) 3 to 10 weight parts of silica matting agent, and (F) 0.1 to 2 weight parts of a amine reaction promoter compound.

In the another preferable embodiments of the present invention, a composition is provided in which mixed soft type and hard type urethaneacrylate oligomer are used, and only acetophenone is used as a photoinitiator. This composition is UV cured under a nitrogen gas environment which is supplied at a pressure of 5 to 10 kg/cm in order to exclude the influence of oxygen. The above composition comprises (A) 10 to 20 weight parts of soft type urethaneacrylate oligomer, and 25 to 35 weight parts of hard type urethaneacrylate oligomer, (B) acrylate based monomer comprised of 5 to 20 weight parts of single functional group monomer, 15 to 25 weight parts of bi-functional group monomer, and 10 to 25 weight parts of tri-functional group monomer, (C) 1 to 5 weight parts of acetophenone photoinitiator. (D) 0.5 to 3 weight parts of silicon additive, and (E) 3 to 10 weight parts of silica matting agent.

The constituents of the above surface treatment composition are described below.

(A) Urethaneacrylate Oligomer

Urethane acrylate is quick at radical polymerization due to photo-initiator initiated reactions, and provides coatings having excellent elasticity and toughness with an especially tight adhesion strength to a polyvinylchloride resin layer. This urethaneacrylate is synthesized by reacting polyisocyanate, polyol, and acrylate compound having hydroxy groups.

5-isocyanate-1-(isocyanatemethyl)-1,3,3-trimethylcyclohexane, 4,4-dicyclohexylmethanediisocyanate, 1,6-diisocyanatehexane, and 1,6-diisocyanatehexane derivatives are used as the polyisocyanate. Among these, it is more preferably to use 4,4-dicyclohexylmethanediisocyanate as it has two cyclohexyl structures that are more stain resistant than linear hydrocarbons.

Polyesterpolyol, polyetherpolyol, and polycarbonatepolyol can be used as the polyol. The physical properties of urethaneacrylate are much dependent on the polyol type, and polyetherpolyol, among the above polyols has good elasticity and low temperature characteristics, but is for inferior to polyesterpolyol in physical chemistry properties. Additionally, an ordinary polyesterpolyol has the disadvantages of insufficient heat resistance and easy hydrolysis. Polycarbonatepolyol, developed to complement the defects of polyesterpolyol, exceeds polyesterpolyol in various physical properties, but it has disadvantages of high cost and a requirement of a relatively large amount of reactive diluent to raise workability due to high viscosities of the final products.

Therefore, caprolactonepolyol made by ring-opening ε-caprolactone is preferably used. Moreover, considering polyol functional groups with good physical properties such as stain resistance, tri-functional group polyol (rather than bi-functional group polyol) is mainly used to generate highly viscous urethaneacrylate. Therefore, bi-functional group caprolactonepolyol and tri-functional group caprolactonepolyol should be used together in the urethaneacrylate manufacturing of the present invention.

2-hydroxyethylacrylate, 2-hydroxypropylacrylate, etc can be used as acrylate having a hydroxy group. Among these acrylates, it is preferable to use 2-hydroxypropylacrylate, which belongs to a low toxicity volatile odor class and for which temperature regulation is easy during synthesis. Furthermore, 2-hydroxypropylacrylate is slow in the reaction as a secondary alcohol resulting in easy reaction control.

Urethaneacrylate oligomer can be divided into hard type and soft type oligomer according to the type and consumed amount of polyisocyanate functional group and polyol. That is, urethaneacrylate oligomer becomes the soft type when the polyisocyanate functional group is a single functional group, and it becomes the hard type when the polyisocyanate functional group is a tri-functional group. Further, the greater the amount of polyester polyol used, the closer the urethaneacrylate oligomer is to having soft type characteristics, while the greater the amount of polyester polyol used makes the urethaneacrylate oligomer closer in character to the hard type. Although soft type urethaneacrylate has excellent abrasion resistance and scratch resistance, as well as good adhesion, it has low stain resistance. Hard type urethaneacrylate has low abrasion resistance scratch resistance, but excellent stain resistance and dries fast. Soft type urethaneacrylate is manufactured by reacting 210 weight parts of 4,4-dicyclohexylmethanediisocyanate, 290 weight parts of bi-functional group caprolactonepolyol, 170 weight parts of tri-functional group caprolactonepolyol, and 330 weight parts of 2-hydroxypropylacrylate. Hard type urethaneacrylate is manufactured by reacting 300 weight parts of 4,4- dicyclohexylmethanediisocyanate, 150 weight parts of bi-functional group caprolactonepolyol, 330 weight parts of tri-functional group caprolactonepolyol, and 220 weight parts of 2-hydroxypropylacrylate.

(B) Acrylate Based Monomer

As the above urethaneacrylate oligomer has a high viscosity of thousands to tens of thousands of centipoise (cps), there are difficulties in applying the actual coating, and it is preferable to decrease the operating viscosity to 500 to 1000 cps by adding monomer having an overall viscosity of less than 100 cps.

In the present invention acrylate based monomers are used which have low viscosity, high reactivity, are volatile, and cause skin irritation. These monomers are classified into single functional group, bi-functional group, and tri-functional group monomers depending on the number of double bonds, and influence the curing rate and coating properties.

2-hydroxyethylacrylate, 2-hydroxypropylacrylate, or a mixture thereof can be used as single functional group acrylate monomer. These have low molecular weights, i.e., low viscosities, which act to decrease the paint viscosity and improve flexibility while at the same time deteriorating stain resistance.

1,6-hexanedioldiacrylate, tripropyleneglycoldiacrylate, or a mixture thereof can be used as bi-functional group acrylate monomer. These have low viscosities and even though there is a difference in reactivities depending on classification, they still have good reactivities. Additionally, they influence the coating hardness.

Trimethylolpropanetriacrylate, trimethylolpropaneethoxytriacrylate, or a mixture thereof can be used as tri-functional group acrylate. Tri-functional group acrylates have an advantage of good curing characteristics due to high reactivities. Stain resistance, hardness, and scratch resistance become better while at the same time the coating can be hardened since the cross linking density is raised when tri-functional group monomer is used.

(B) Photoinitiator

The above urethaneacrylate oligomers and acryl based monomers are reacted with each other and cured by a photoinitiator which activates to cause radical reaction when exposed to light with certain range of wavelengths. The photoinitiator should be selected appropriately depending on the types of coating, coating thickness, and operating conditions such as line speed, lamp, and presence of pigment. These photoinitiators include acetophenone, benzylketal, photoactivator, aromatic ketones, etc., while acetophenone which has superior anti-yellowing properties is preferable for uses for decorative polyvinylchloride resin floor covering.

In case that a mixture of soft type and hard type urethaneacrylate oligomer is used, acetophenone and benzophenone should be used together to promote the surface curing by minimizing the curing reaction hindrance due to oxygen. However, benzophenone alone can not be activated by ultraviolet rays, and in fact it can be activated only under the presence of a tertiary amine reaction promoter. A small amount of benzophenone photoinitiator and amine based reaction promoter can be added depending on wood patterns and colors despite the disadvantages of weak yellowing properties on account of both benzophenone photoinitiator and amine based reaction promoter having a double bond in their structures.

(D) Silicon Additive

Additives can be added to improve the surface flatness, make the surface slick, and produce a slightly wet feeling on a decorative floor covering. Additives can also be added to repress or burst air bubbles which can be produced during production. Either non-reactive or reactive silicon can be used in the present invention. There is also an advantage that use of reactive silicon has an enduring stain-prevention effect.

(E) Silica Matting Agent

It is preferable that a silica with a wax treated surface for good stain resistance is used as a non-glossy raw material for a matting agent. However, as the surface can be too slippery depending on the amount of silica, the content should be appropriate and the mixing and application methods with other types of quenching agents can also be considered.

The structure of a decorative floor covering in which the surface is treated by the above polyurethane based composition will now be described with reference to the attached drawings.

A decorative floor covering of the present invention comprises of a backing layer (10), a substrate layer (20), and a surface layer (30) as presented in FIG. 1a. The backing layer (10) is subdivided into a bottom foaming sub-layer (11) or a mechanical foaming sub-layer (12) and a sizing sub-layer (13), and the surface layer (30) is subdivided into an upper foaming sub-layer (31) or a non-foaming sub-layer (32), a printing sub-layer (33), a skin sub-layer (34), and a surface treating sub-layer (35). A sizing sub-layer (13) and a foaming sub-layer (11) or a mechanical foaming sub-layer (12) inside a backing layer (10) can be substituted for each other. Herein, a chemically foamed sub-layer is referred to as a 'foaming sublayer' and a mechanically foamed sub-layer is referred to as a 'mechanical foaming sublayer.'

Figure 1B:
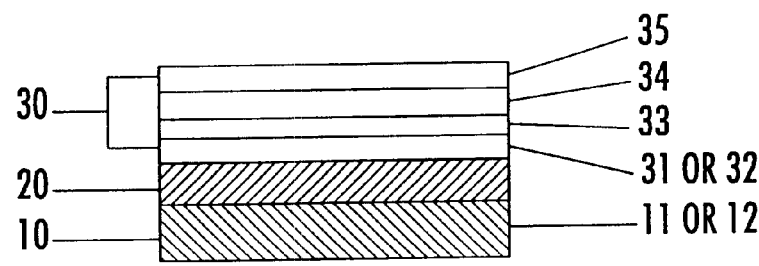
Figure 1C:
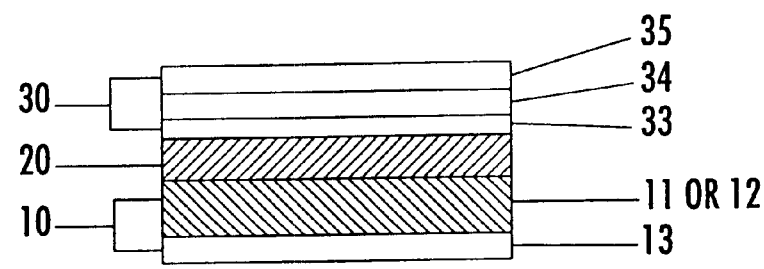
Figure 1D:
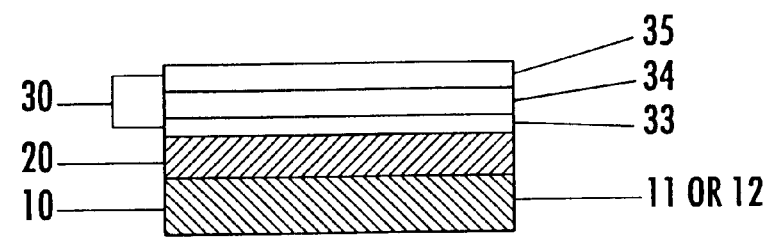

Parts of the above sublayers in a backing layer (10) and a surface layer (30) can be omitted if it is necessary to do so as represented in FIG. 1b to FIG. 1d. The sizing sub-layer (13) is omitted in backing layer (10) in FIG. 1b, the upper foaming sub-layer (31) (or the non-foaming sub-layer (32)) is omitted in surface layer (30) in FIG. 1c, and both the sizing sublayer (13) in backing layer (10) and the upper foaming sub-layer (31) (or the non-foaming sublayer (32)) in a surface layer (30) are omitted in FIG. 1d.

Figure 2:
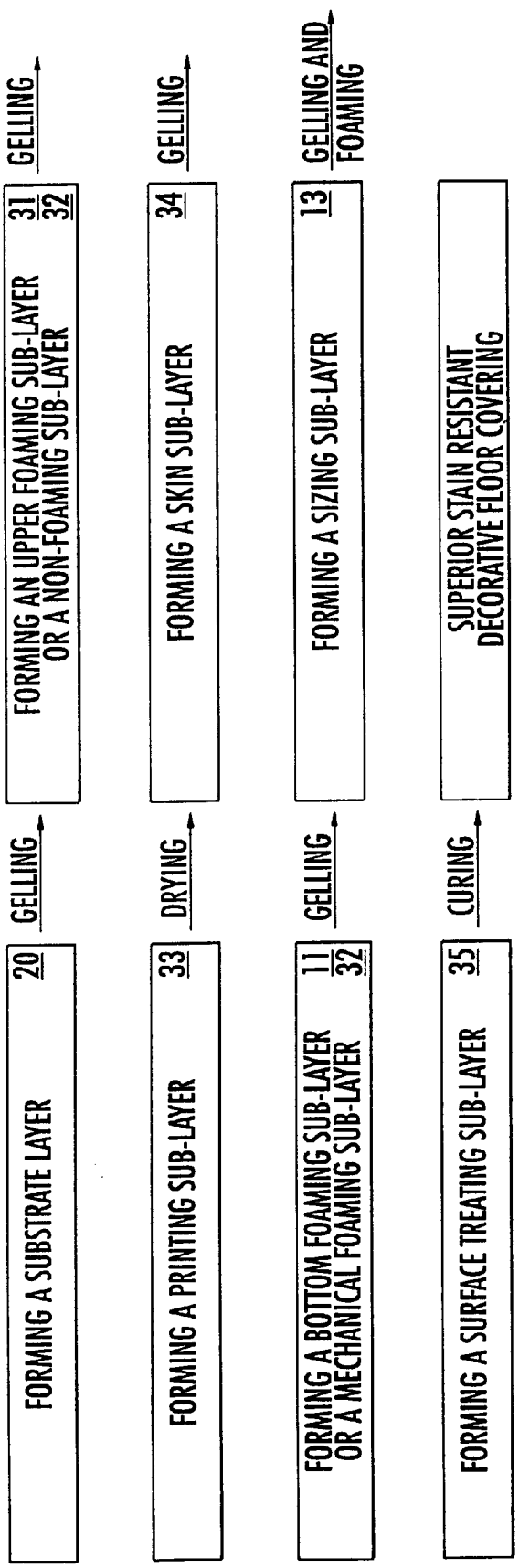
FIG. 2 is a manufacturing process diagram of a decorative floor covering in accordance with the present invention.

A method for manufacturing a decorative floor covering according to the present invention is represented in FIG. 2 and comprises the following steps. First, a substrate layer (20) is manufactured that provides dimensional stability to the products wherein a substrate layer (20) composition is of a sol phase made by mixing 100 weight parts of polyvinylchloride resin having a degree of polymerization of 1,000 to 3,000 with 20 to 50 weight parts of dioctylphthalate (DOP) plasticizer, 15 to 50 weight parts of butylbenzylphthalate (BBP) plasticizer, 1 to 10 weight parts of barium-zinc based compound stabilizer, 1 to 20 weight parts of titanium oxide pigment, 1 to 170 weight pars of bicarbonate calcium filler, and 1 to 5 weight parts of other epoxy resin additives containing soybean oil for long term low temperature heat-proofing. The substrate layer (20) is formed by pressurized knife coating the above composition to a thickness of 0.38 to 0.50 millimeters (mm) on a substrate such as glass fiber, vellum paper, etc., and then by heating to gel for one to two minutes in an oven at a temperature of 130° C. to 200° C. at a line speed of 40 to 50 meters/minute (m/min).

Second, forming an upper foaming sub-layer (31) (which provides a cushion feeling over the substrate layer (20)) or forming a non-foaming sub-layer (32) that provides a product hardness is produced, wherein the upper foaming sub-layer (31) composition is made by mixing 100 weight parts of polyvinylchloride resin having a degree of polymerization of 1,000 to 2,000 with 40 to 60 weight parts of dioctylphthalate primary plasticizer 10 to 20 weight parts of a paraffin based compound secondary plasticizer; 2 to 5 weight parts of azodicarbonamide foaming agent, 2 to 4 weight parts of zinc white foaming promoter, 1 to 3 weight parts of potassium-zinc based compound foaming stabilizer, 1 to 5 weight parts of titanium oxide pigment, 1 to 150 weight parts of dicarbonate calcium filler, and 0.2 to 1.5 weight parts of other viscosity reducer additives. The upper foaming sub-layer (31) is formed by knife coating the above composition to a thickness of 0.1 to 0.3 mm. and then by heating to gel for one to two minutes in an oven at a temperature of 150° to 200° C. at a line speed of 10 to 30 m/min.

Third, a non-foaming sub-layer (32) composition is made by mixing 100 weight parts of polyvinylchloride resin having a degree of polymerization of 1,000 to 3,000 with 20 to 40 weight parts of dioctylphthalate primary plasticizer, 10 to 20 weight parts of butylbenzylphthalate, 10 to 20 weight parts of paraffin based compound secondary plasticizer, 1 to 150 weight parts of dicarbonate calcium filler, 1 to 5 weight parts of titanium oxide pigment, 1 to 10 weight parts of heat resistant barium-zinc based compound stabilizer, and 1 to 5 weight parts of epoxy resin containing soybean oil for long term low temperature heat proofing. The non-foaming sub-layer (32) is then formed by knife coating the above composition to a thickness of 0.1 to 0.3 mm, and then by heating to gel for one to two minutes in an oven at a temperature of 150° to 200° C. at a line speed of 10 to 30 m/min.

Then, printing sub-layer (33) is formed by printing certain patterns on the upper foaming sub-layer (31) or the non-foaming sub-layer (32) using methods such as gravure printing, screen printing, or transfer printing.

After the above printing sub-layer (33) is dried, a skin sub-layer (24) is formed which provides clarity and durability for this printing sub-layer, as well as protecting the printing sub-layer (33) patterns. A skin sub-layer (34) composition is made by mixing 100 weight parts of polyvinylchloride resin having a degree of polymerization of 1,500 to 3,000 with 20 to 40 weight parts of dioctylphthalate primary/ plasticizer, 10 to 20 weight parts of paraffin based compound secondary plasticizer, 2 to 10 weight parts of heat resistant barium-zinc based compound stabilizer, 2 to 5 weight parts of epoxy resin containing soybean oil for long term low temperature heat proofing, and 0.2 to 5 weight parts of a viscosity reducer. The skin sub-layer is formed by knife coating the above composition to a thickness of 0.2 to 0.5 mm on a printing sub-layer (33). and then by heating to gel for one to two minutes in an oven at a temperature of 180° to 210° C. at a line speed of 10 to 30 m/min.

Next, a bottom sub-layer (11) or a mechanical foaming sub-layer (12) is formed that provides a cushion feeling under the substrate layer (20). The above bottom foaming sub-layer (11) composition is made by mixing 100 weight parts of polyvinylchloride resin having a degree of polymerization 500 to 4,000. 20 to 80 weight parts of dioctylphthalate and 10 to 20 weight parts of butylbenzylphthalate primary plasticizers, 10 to 20 weight parts of paraffin based compound secondary plasticizer, 1 to 10 weight parts of azodicarbonamide foaming agent, 1 to 4 weight parts of zinc white foaming promoter, 1 to 10 weight parts of potassium-zinc based compound foaming stabilizer, 0.2 to 1.0 weight parts of foaming cell controlling agent acryl based resin, 1 to 20 weight parts of organic pigment, 1 to 5 weight parts of titanium oxide pigment, and 1 to 250 weight parts of dicarbonate calcium filler. The bottom foaming sub-layer (11) is formed by knife coating the above composition to a thickness of 0.2 to 1.0 mm, and then heating to gel for 20 to 90 seconds in an oven at a temperature of 150° to 180° C. at a line speed of 5 to 50 m/min.

A mechanical foaming sub-layer (12) composition is foamed by high speed agitating under a supply of compressed air after 100 weight parts of polyvinylchloride resin having a degree of polymerization of 1,000 to 3,000 are mixed with 40 to 70 weight parts of dioctylphthalate and 1 to 10 weight parts of butylbenzylphthalate plasticizers, 2 to 5 weight parts of heat resistant barium-zinc based compound stabilizer, and 5 to 20 weight parts of silicone resin foaming agent dissolved in dioctyladiphate (with 0.2 to 1.5 weight parts of a viscosity reducer and 1 to 60 weight parts of dicarbonate calcium filler included according to the process requirements), and then fed into a mechanical foaming mixer. The mechanical foaming sublayer (12) is formed by knife coating the above composition to a thickness of 2 to 5 mm, and then heating to gel for one to five minutes in an oven at a temperature of 150° to 200° C. at a line speed of 10 to 30 m/min.

Then, a sizing sub-layer (13) is formed that provides product hardness under the bottom foaming sub-layer (11) or the mechanical foaming sub-layer (12). The sizing sub-layer (13) composition is made by mixing 100 weight parts of polyvinylchloride resin having a degree of polymerization of 1,000 to 3,000 with 20 to 80 weight parts of dioctylphthalate primary plasticizer, 5 to 30 weight parts of 2,2,4-trimethyl-1,3-phentanedioldiisobutyrate, 5 to 20 weight parts of paraffin based compound, 1 to 10 weight parts of organic pigment, 1 to 20 weight parts of titanium oxide pigment, 1 to 10 weight parts of heat resistant baruim-zinc based compound stabilizer, 1 to 250 weight parts of dicarbonate calcium filler, and other additives such as 1 to 5 weight parts of epoxy resin containing soybean oil for long term low temperature heat proofing, and 2 to 30 weight parts of yellow soil (dirt). Yellow soil and the organic pigment, which are for both color and function, are added as needed. The sizing sub-layer (13) is formed by knife coating the above composition to a thickness of 0.5 to 1.0 mm, and then heating to gel for 30 to 180 seconds in an oven at a temperature of 170° to 210° C. at a line speed of 5 to 50 m/min; thereupon, the upper foaming sub-layer (31) and the bottom foaming sub-layer (11) are foamed.

Finally, a surface treating sub-layer (35) is formed for maintaining the surface strength of a skin sub-layer (34). After a surface treatment composition is air-knife coated to a thickness of 10 to 40 μm at a line speed of 5 to 30 m/min, it is cured by using 4 to 8 medium pressure mercury lamps with an output of 200 to 300 watt/in$^2$. The distance between medium pressure mercury lamps and the radiation distance are preferably 20 to 50 cm, and 10 to 20 cm, respectively. Among the previously explained surface treatment compositions, when a composition in which soft type urethaneacrylate oligomer and a small amount of single functional group monomers are used, it is preferable that coating thickness is 20 μm , 6 medium pressure mercury lamps with an output of 300 watt/in$^2$ are used, and the line speed is 30 m/min.

Preferred examples are disclosed below in order to help gain an understanding of the present invention. However, the following examples are only provided to assist in easily understanding the present invention, and the present invention Is not restricted to the following examples.

EXAMPLES AND COMPARATIVE EXAMPLES

The compositions and manufacturing methods of a substrate layer (20) an upper foaming sub-layer (31), a printing sub-layer (33), a skin sub-layer (34), a bottom foaming sub-layer (11), and a sizing sub-layer (13) which comprise decorative floor coverings of the following examples and comparative examples are as follows.

Manufacturing of a Substrate Layer (20)

A substrate layer (20) was manufactured by pressurized knife coating a composition represented in the below Table 1 on glass fiber substrate to a thickness of 0.38 mm, and then heating to gel for 90 seconds in an oven at a temperature of 160° C. at a line speed of 40 m/min.

Manufacturing of an Upper Foaming Sub-layer (31)

An upper foaming sub-layer (31) was manufactured by knife coating a composition represented in the below Table 1 on the above substrate layer (20) to a thickness of 0.2 mm, and then heating to gel and foam for 90 seconds in an oven at a temperature of 108° C. at a line speed of 30 m/min.

Manufacturing of a Printing Sub-layer (33)

A printing sub-layer (33) was formed by printing patterns on the above upper foaming sub-layer (33), and then drying it.

Manufacturing of a Skin Sub-layer (34)

A skin sub-layer (34) was manufactured by knife coating a composition represented in the below Table 1 on the above printing sub-layer (33) to a thickness of 0.2 mm, and then heating to gel for 90 seconds in an oven at a temperature of 200° C. at a line speed of 20 m/min.

Manufacturing of a Bottom Foaming Sub-layer (11)

A bottom foaming sub-layer (11) was manufactured by knife coating a composition represented in the below Table 1 under the above substrate layer (20) to a thickness of 0.5 mm, and then heating to gel for 40 seconds in an oven at a temperature of 180° C. at a line speed of 20 m/min.

Manufacturing of a Sizing Sub-layer (13)

A sizing sub-layer (13) was manufactured by knife coating a composition represented in the below Table 1 under the above bottom foaming sub-layer (11) to a thickness of 0.2 mm, and then heating to gel for 90 seconds in an oven at a temperature of 200° C. at a line speed of 20 m/min. the above upper foaming sub-layer (31) and bottom foaming sub-layer (11) were foamed simultaneously when the above sizing sub-layer (13) was formed.

TABLE 1

| Layer/sub-layer | Composition |
|---|---|
| Substrate layer (20) | 100 wt parts of polyvinylchloride resin with a degree of polymerization of 1.700 24 wt parts of dioctylphthalate plasticizer 17 wt parts of butylbenzylphthalate plasticizer, 2.0 wt parts of barium-zinc based compound stabilizer (BZ613)-Songwon Industries Corporation) 2 wt parts of titanium oxide pigment 170 wt parts of dicarbonate calcium filler 3 wt parts of epoxy resin additive |
| Upper foaming sub-layer (31) | 100 wt parts of polyvinylchloride resin with a degree of polymerization of 1.200 50 wt parts of dioctylphthalate primary plasticizer, 15 wt parts of paraffin based compound secondary plasticizer. 3 wt parts of azodicarbonamide foaming agent. 2 wt parts of zinc while foaming promoter 1 wt part of potassium-zinc based compound foaming stabilizer (BZ810p-5-Songwon Industries Corporation). 2 wt parts of titanium oxide pigment, 50 wt parts of dicarbonate calcium filler, 0.3 wt parts of viscosity reducer additive |

TABLE 1-continued

| Layer/sub-layer | Composition |
|---|---|
| Skin sub-layer (34) | 100 wt parts of polyvinylchloride resin with a degree of polymerization of 1.700, 25 wt parts of dioctylphthalate primary plasticizer. 12 wt parts of paraffin based compound secondary plasticizer. 3 wt parts of heat resistant barium-zinc based compound stabilizer (BZ613-Songwon Industries Corporation), 3 wt parts of epoxy resin additive, 0.2 wt parts of viscosity reducer additive |
| Bottom foaming sub-layer (11) | 100 wt parts of polyvinylchloride resin with a degree of polymerization of 1.200. 42 wt parts of dioctylphthalate primary plasticizer 10 wt parts of butylbenzylphthalate primary plasticizer, 10 wt parts of paraffin based compound secondary plasticizer, 3.5 wt parts of azodicarbonamide foaming agent, 2.8 wt parts of zinc white foaming promoter, 1.4 wt parts of potassium-zinc based compound foaming stabilizer (BZ810p-5-Songwon Industries Corporation), 0.4 wt parts of foaming cell controlling agent acryl based resin (BX1010-Korea Daenyup Corporation), 5 wt parts of organic pigment 2 wt parts of titanium oxide pigment. 60 wt parts of dicarbonate calcium filler |
| Sizing sub-layer (13) | 100 wt parts of polyvinylchloride resin with a degree of polymerization of 2.000 35 wt parts of dioctylphthalate primary plasticizer, 13 wt parts of 2,2,4-trimethyl-1,3-pentanedioldiisobutyrate primary plasticizer, 17 wt parts of paraffin based compound seondary plasticizer, 3 wt parts of heat resistant barium-zinc based compound stabilizer (BZ613-Songwon Industries Corporation), 1 wt part of organic pigment 8 wt parts of titanium oxide pigment, 90 wt parts of dicarbonate calcium filler 3 wt parts of epoxy resin additive 5 wt parts of yellow soil (dirt) filler |

Examples 1 to 2 and Comparative Examples 1 to 3

After surface treatment compositions represented in the following Table 2 were air-knife coated on the above manufactured skin sub-layer (34) to a thickness of 20 μm at a line speed of 20 m/min, they were cured under 6 medium pressure mercury lamps having an output of 300 watt/in² to form a surface treating sub-layer (35) and produced a decorative floor covering.

TABLE 2

| | Weight parts | | | | |
|---|---|---|---|---|---|
| Compositions | EX 1 | EX 2 | COM 1 | COM 2 | COM 3 |
| Urethaneacrylate oligomer | 40 | 40 | 45 | 40 | 43 |
| Single functional group monomer 2-hydroxypropylacrylate | 10 | 10 | 20 | — | 20 |
| Bi-functional group monomer 1,6-hexanedioldiacrylate | 35 | 40 | 26 | 45 | 5 |
| Tripropyleneglycoldiacrylate | — | — | — | — | 20 |
| Tri-functional group monomer Trimethylolpropane-ethoxytriacrylate | 5 | — | — | 5 | — |
| Acetophenone photoinitiator | 4 | 4 | 4 | 4 | 5 |
| Reactive silicon additive | 1 | 1 | 1 | 1 | 2 |
| Silica matting agent | 5 | 5 | 5 | 5 | 5 |

Example 3

After surface treatment compositions represented in the following Table 3 were air-knife coated on the above skin sub-layer (34) to a thickness of 20 μm, they were cured using 6 medium pressure mercury lamps having an output of 300 watt/in$^2$ with the strongest wavelength at 365 nm and at a line speed of 5 m/min to form a surface treating sub-layer (35) and produce decorative floor covering. The distance between the medium pressure mercury lamps and the irradiation distance were adjusted to 30 cm and 15 cm, respectively.

Example 4

After surface treatment compositions represented in the following Table 3 were air-knife coated on the above skin sub-layer (34) to a thickness of 20 μm, they were cured using 6 medium pressure mercury lamps having an output of 300 watt/in$^2$ with the strongest wavelength at 365 nm and at a line speed of 10 m/min to form a surface treating sub-layer (35) and produce a decorative floor covering. The distance between the medium pressure mercury lamps and the irradiation distance were adjusted to 30 cm and 15 cm, respectively.

Example 5

After surface treatment compositions represented in the following Table 3 were air-knife coated on the above skin sub-layer (34) to a thickness of 20 μm, they were cured using 7 medium pressure mercury lamps having an output of 300 watt/in$^2$ with the strongest wavelength at 365 nm and at a line speed of 15 m/min to form a surface treating sub-layer (35) and produce a decorative floor covering. The distance between the medium pressure mercury lamps and the irradiation distance were adjusted to 30 cm and 15 cm, respectively.

TABLE 3

|  | Weight parts | | |
| --- | --- | --- | --- |
| Compositions | EX 3 | EX 4 | EX 5 |
| Soft type urethaneacrylate oligomer | — | — | — |
| Hard type urethaneacrylate oligomer | 45 | 45 | 45 |
| Single functional group monomer 2-hydroxypropylacrylate | — | — | — |
| Bi-functional group monomer 1 6-hexanedioldiacrylate | 25 | 20 | 15 |
| Tri-functional group monomer Trimethylolpropaneethoxytriacrylate | 20 | 25 | 30 |
| Acetophenone photoinitiator | 4 | 4 | 4 |
| Reactive silicor additive | 1 | 1 |  |
| Wax coated silica matting agent | 5 | 5 | 5 |

Example 6

After surface treatment compositions represented in the following Table 4 were air-knife coated on the above skin sub-layer (34) to a thickness of 20 μm, they were cured using 6 medium pressure mercury lamps having an output of 300 watt/in$^2$ with the strongest wavelength at 365 nm and at a line speed of 5 m/min to form a surface treating sub-layer (35) and produce a decorative floor covering. The distance between the medium pressure mercury lamps and the irradiation distance were adjusted to 30 cm and 15 cm, respectively.

Example 7

After surface treatment compositions represented in the following Table 4 were air-knife coated on the above skin sub-layer (34) to a thickness of 20 μm, they were cured using 7 medium pressure mercury lamps having an output of 300 watt/in$^2$ with the strongest wavelength at 365 nm and at a line speed of 10 m/min to form a surface treating sub-layer (35) and produce a decorative floor covering. The distance between the medium pressure mercury lamps and the irradiation distance were adjusted to 30 cm and 15 cm, respectively.

Example 8

After surface treatment compositions represented in the following Table 4 were air-knife coated on the above skin sub-layer (34) to a thickness of 20 μm, they were cured using 7 medium pressure mercury lamps having an output of 300 watt/in$^2$ with the strongest wavelength at 365 nm and at a line speed of 15 m/min to form a surface treating sub-layer (35) and produce a decorative floor covering. The distance between the medium pressure mercury lamps and the irradiation distance were adjusted to 30 cm and 15 cm, respectively.

TABLE 4

|  | Weight parts | | |
| --- | --- | --- | --- |
| Compositions | EX 6 | EX 7 | EX 8 |
| Soft type urethaneacrylate oligomer | 20 | 15 | 10 |
| Hard type urethaneacrylate oligomer | 26 | 30 | 35 |
| Single functional group monomer 2-hydroxypropylacrylate | 10 | 5 | 5 |
| Bi-functional group monomer 1,5-hexanedioldiacrylate | 25 | 20 | 15 |
| Tri-functional group monomer Trimethylolpropaneethoxytriacrylate | 10 | 20 | 25 |
| Acetophenone photoinitiator | 3 | 3 | 3 |
| Benzophenone photoinitiator | 0.5 | 0.5 | 0.7 |
| Amine reaction promoter | 0.5 | 0.4 | 0.3 |
| Reactive silicon additive | 1 | 1 | 1 |
| Wax coated silica matting agent | 8 | 5 | 5 |

Stain Resistance Evaluation

The decorative floor coverings of EXAMPLES 1 to 8, on which polluting materials were easily removed without leaving marks, turned out to be superior in stain resistance. On the other hand, the decorative floor covering of COMPARATIVE EXAMPLE 1 on which oil constituent staining materials such as oil based magic marker pen were not easily erased and left marks when wiped with a dried cloth showed reduced stain resistance even though it had good stain resistance against water based constituents. Further, the decorative floor covering of COMPARATIVE EXAMPLE 2 had much too hard a coating to be appropriate for a decorative floor covering although it displayed good stain resistance against oil and water constituents. The degrees of stain removal were evaluated with grades of A to D for the decorative floor coverings of EXAMPLE 8 and COMPARATIVE EXAMPLE 3, and are represented in the following Table 5.

TABLE 5

| Pollutant | Time elapsed | EXAMPLE 8 | | | COMPARATIVE EXAMPLE 3 | | |
|---|---|---|---|---|---|---|---|
| | | Dried cloth | Wetted mop | Methyl alcohol | Dried cloth | Wetted mop | Methyl alcohol |
| Oil based magic marker pen (weak solvent type MONAMI OIL MAGIC) | after 30 min | A | A | A | D | D | C |
| | after 3 days | A | A | A | D | D | C |
| Oil based magic marker pen (strong solvent type MONAMI OIL MAGIC) | after 30 min | A | A | A | C | D | C |
| | after 3 day | A | A | A | C | D | C |
| Oil based magic marker pen (MICRO) | after 30 min | A | A | A | C | D | C |
| | after 3 days | A | A | A | D | D | C |
| Oil based Name Pen (MONAMI) | after 30 min | A | B | A | D | D | C |
| | after 3 days | B | B | A | D | D | C |
| Ballpoint pen (MONAMI 153) | after 30 min | A | B | A | D | D | A |
| | after 3 days | A | B | A | D | D | C |
| Ink for pens (Pilot Super) | after 30 min | A | A | A | C | D | B |
| | after 3 days | A | A | A | D | D | B |
| Chinese ink for brush writing | after 30 min | A | A | A | D | C | A |
| | after 3 days | A | A | A | D | C | B |
| Fluorescent hi-liting pen (MONAMI Memory S) | after 30 min | A | A | A | D | C | A |
| | after 3 days | A | A | A | D | C | A |
| Pastel crayons (DONGA Pinocchio) | after 30 min | A | A | A | B | B | A |
| | after 3 days | A | A | A | B | B | A |
| Coffee | after 30 min | A | A | A | D | A | A |
| | after 3 days | A | A | A | A | A | A |
| Mustard | after 30 min | A | A | A | A | A | A |
| | after 3 days | A | A | A | C | C | B |
| Red antiseptic | after 30 min | A | A | A | D | C | B |
| | after 3 days | A | A | A | D | C | C |
| Nail polish | after 30 min | A | A | A | D | D | A |
| | after 3 days | A | A | A | D | D | A |
| Oil paint | after 30 min | A | A | A | D | D | A |
| | after 3 days | A | A | A | D | D | D |
| Water paint | after 30 min | A | B | A | C | C | A |
| | after 3 days | A | B | A | C | C | A |
| Varnish | after 30 min | A | A | A | D | D | A |
| | after 3 days | A | A | A | D | D | D |
| Pigment solution | after 30 min | A | A | A | D | D | A |
| | after 3 days | A | A | A | D | D | A |
| Dye solution | after 30 min | B | B | B | D | D | B |
| | after 3 days | B | B | B | D | D | C |
| Newspaper dye transfer | after 30 min | A | A | A | D | A | A |
| | after 3 days | A | A | A | D | D | A |

Notes)
A: no staining,
B: slight residual staining,
C: significant residual staining,
D: non removable stain.

A superior pollution resistant decorative floor covering which is not stained by pollutants and which is easily cleaned can be obtained applying UV cured polyurethane based surface treatment compositions of the present invention on the surface of a decorative floor covering under the appropriate coating and curing conditions.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A method for manufacturing a decorative floor covering which is comprised of a backing layer, a substrate layer, and a surface layer, in which the backing layer is comprised of one of a foaming sub-layer and a mechanical foaming sub-layer, and a sizing sub-layer, and wherein the surface layer is comprised of one of a foaming sub-layer and a non-forming sub-layer, a printing sub-layer, and a skin sub-layer, comprising the processes of:

(A) air-knife coating a surface treatment composition comprising
40 weight parts of urethaneacrylate oligomer;
acrylate based monomer comprised of 7 to 11 weight parts of single functional group monomer, 34 to 43 weight parts of bi-functional group monomer, and 0 to 5 weight parts of tri-functional group monomer;
4 weight parts of acetophenone photoinitiator;
1 weight part of reactive silicon additive; and
5 weight parts of silica matting agent, wherein the air-knife coating applies the surface treatment composition to a thickness of 10 to 40 $\mu$m on the skin sub-layer; and (B) curing the coated surface treatment composition at a line speed of 5 to 30 m/min using 4 to 8 middle pressure mercury lamps having an output of 200 to 300 watt/in$^2$.

2. A method in accordance with claim 1 wherein air-knife coating comprises air-knife coating the surface treatment composition wherein the single functional group monomer is selected from a group comprised of 2-hydroxyethylacrylate, 2 hydroxypropylacrylate, and a mixture thereof; and wherein the bi-functional group monomer is selected from a group comprised of 1,6-hexanedioldiacrylate, tripropyleneglycoldiacrylate, and a mixture thereof; and wherein the tri-functional group monomer is selected from a group comprised of trimethylolpropanetriacrylate, trimethylolpropaneethoxytriacrylate, and a mixture thereof.

* * * * *